Dec. 31, 1935. F. SCHAEFER 2,026,324
BRAKE SHOE KEY
Filed June 5, 1934

INVENTOR.
Frederic Schaefer.
BY Brown, Critchlow & Flick
ATTORNEYS.

Patented Dec. 31, 1935

2,026,324

UNITED STATES PATENT OFFICE 2,026,324

BRAKE SHOE KEY

Frederic Schaefer, Pittsburgh, Pa.

Application June 5, 1934, Serial No. 729,047

8 Claims. (Cl. 188—243)

The invention relates to keys for connecting brake shoes to brake heads supported by brake beams of railway brakes, the keys provided according to my invention being applicable to brake shoes and heads of standard construction having cooperating lugs provided with openings for receiving the keys.

The standard brake shoe locking key now customarily used consists of a single tapered curved bar of steel having its upper end turned outwardly to form a head for driving it in place and removing it. The vibration to which brakes are subjected in use, and the frictional rotation of truck wheels in both directions against brake shoes when the brakes are applied, quickly loosen the keys, which results in permitting the shoes to tilt from the heads to which they are attached and to accordingly drag upon the wheels and rub against the brake heads with consequent rapid wear of both the shoe and head. Furthermore, not infrequently standard keys fail, permitting the shoes to become disconnected from the heads, and when cars are turned upside down for unloading them, as is customarily done in unloading coal and iron ore cars, standard keys which have become loosened frequently drop out.

While various attempts have been made to provide keys to overcome these and other disadvantages of standard keys, to the best of my knowledge and belief none of them has been used to any substantial extent because of various difficulties attending their manufacture and use.

The object of my invention is to provide a brake shoe locking key which may be easily and quickly inserted in position, and which when inserted may be positively locked in position to prevent loosening or disconnection of brake shoes, and to provide a key having these characteristics which may be economically manufactured.

Figure 1:
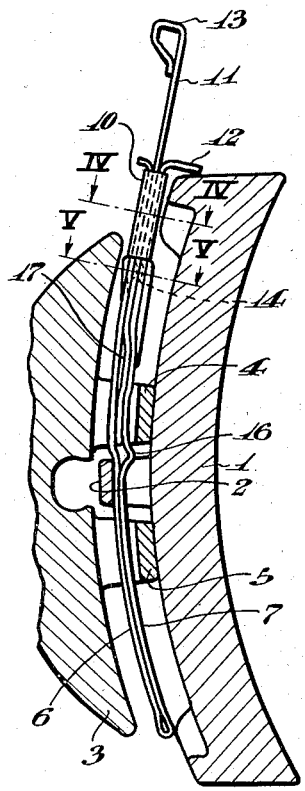
Figure 3:
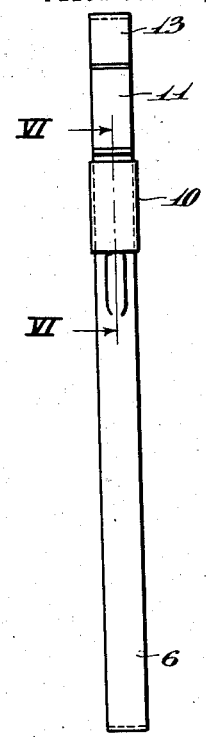
Figure 2:
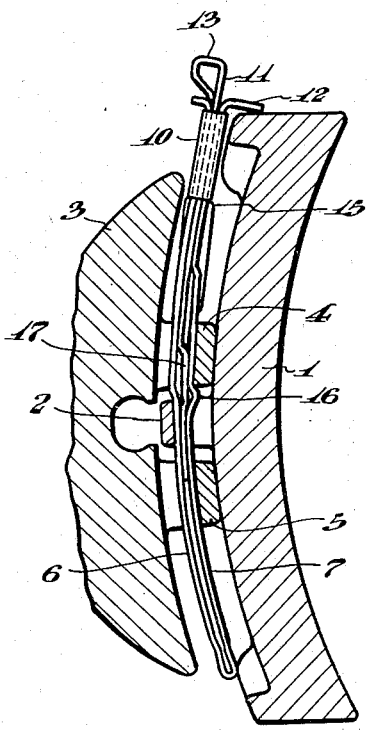
Figure 4:
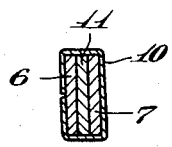
Figure 5:
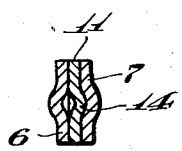
Figure 6:
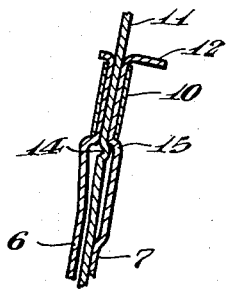

The invention is illustrated in the accompanying drawing, of which Fig. 1 is a vertical central sectional view through a brake head and shoe assembled in operative position, and a side view of a key embodying my invention inserted through the lugs of the head and shoe; Fig. 2 a view similar to Fig. 1 showing the key in its locked position; Fig. 3 a face view of the key; Figs. 4 and 5 transverse sectional views of the key taken on the lines IV—IV and V—V, Fig. 1; and Fig. 6 a sectional view taken on the line VI—VI, Fig. 3.

The key provided according to my invention comprises a pair of spring-like metal arms, preferably formed of strips of spring metal, connected to each other at their ends, and provided with a detent for engaging a lug of a brake head or shoe, preferably the former. Associated with the arms of the key there is a member which is movable to and from a position to spread the arms in positive locking position. Preferably this movable member is in the form of a strip of spring metal slidably mounted for longitudinal movement between the two arms of the key and provided intermediate of its ends with an offset portion to effectively press the lug-engaging detent of one of the key arms into shoe-locking position. When this locking strip is withdrawn to its outer position the key may be readily inserted through the lugs of a brake head and shoe to attach the latter to the former, and when driven inwardly the locking strip not only presses the detent of the key into engagement with a brake head or shoe lug, but, together with the arms of the key, forms a three-leaf spring key which further assures firm and positive locking of the brake shoe to the head.

Referring to the illustrative embodiment of the invention, and first to Fig. 1, a brake shoe 1 having a central lug 2 is shown applied to a brake head 3 provided with a pair of lugs 4 and 5 straddling lug 2, all of standard construction. The locking key comprises a pair of spring arms 6 and 7 which are connected to each other at their lower ends, as by being formed from a single strip of metal bent upon itself. The upper ends of the arms may be connected to each other by a metal sleeve 10 which surrounds them and is of sufficient interior width to receive the arms and a locking strip 11. These or equivalent connections of the arms together are preferably such as to cause the two arms to be yieldingly urged towards each other. The upper ends of the arms are turned outwardly as shown, the outturned end of arm 7 forming a stop 12 for engaging the upper end of a brake shoe to limit the downward movement of the locking key when it is inserted. The upper end of locking strip 11 is provided with a head 13 for inserting and withdrawing the strip, and immediately below the lower end of sleeve 10 when strip 11 is in its outer position, the strip is provided with a hump 14 adapted to be engaged by an offset 15 formed in arm 7 adjacent to the lower end of sleeve 10. The purpose of hump 14 is to prevent the removal of locking strip 11 from the arms of the key.

Intermediate of its ends, arm 7 is provided with a detent 16, which, in the inserted position of the locking key, preferably lies just below the lower edge of the upper brake shoe lug 4. Near its lower end locking strip 11 is also preferably provided with an extended offset or shoulder portion 17, which, when the strip is in its inserted position shown in Fig. 2, effectively spreads the arms outwardly with detent 16 of arm 7 in positive engagement with the lower edge of lug 4. Offset 17 also compensates for variations in the openings of brake head and shoe lugs, the offset being somewhat flattened when the openings are small, and being sufficiently large to adequately spread the key arms when the openings are large.

In its locked position shown in Fig. 2, the key positively holds the shoe firmly attached to the head, and, on account of the yielding character of the arms and locking strip of the key, the key can not be jarred loose. Furthermore, in its locked position the key forms a three-leaf spring between the lugs of a brake head and shoe, tending strongly to prevent relative wearing movements between the head and shoe. To remove the key, it is only necessary to withdraw locking strip 11 to its outer position shown in Fig. 1, whereupon the arms 6 and 7 of the key collapse, being yieldingly urged towards each other. The key may then be easily removed to detach a shoe.

According to the provisions of the patent statutes, I have explained the principle and operation of my invention, and have illustrated what I now consider to represent its best embodiment. However, I desire to have it understood that, within the scope of the appended claims, the invention may be practiced otherwise than as illustrated and described.

I claim as my invention:

1. A key for connecting a brake shoe to a brake head having cooperating lugs, comprising a pair of adjacent spring-like arms connected to each other and provided with a lug-engaging detent, and a member associated with said arms and movable to and from a position to spread said arms in shoe-locking position.

2. A key for connecting a brake shoe to a brake head having cooperating lugs, comprising a pair of adjacent resilient arms connected to and yieldingly urged towards each other and provided with a lug-engaging detent, and a member associated with said arms and movable to and from a position to spread them outwardly to shoe-locking position.

3. A key for connecting a brake shoe to a brake head having cooperating lugs, comprising a pair of resilient arms connected to each other and provided with a lug-engaging detent, and a member slidably mounted between said arms and movable to and from a position to spread said arms into shoe-locking position.

4. A key for connecting a brake shoe to a brake head having cooperating lugs, comprising a pair of resilient arms connected to and yieldingly urged towards each other and provided with a lug-engaging detent, and a member slidably mounted between said arms and movable longitudinally thereof for spreading them to position said detent thereof in locked engagement with a brake element lug.

5. A key for connecting a brake shoe to a brake head having cooperating lugs, comprising a pair of resilient arms connected to and yieldingly urged towards each other and provided with a lug-engaging detent, and a strip-like member slidably mounted between said arms and movable inwardly thereof to spread the arms in locking position and movable outwardly thereof to permit the arms to collapse and the key to be withdrawn.

6. A key for connecting a brake shoe to a brake head, comprising a pair of resilient arms connected to each other, and a resilient strip-like member engaged by and slidably mounted between said arms to spread them to locking position.

7. A key for connecting a brake shoe to a brake head having cooperating lugs, comprising a pair of resilient arms connected to each other and provided with a lug-engaging detent, a strip-like member slidably mounted between the arms and movable inwardly thereof for spreading them to position said detent in locked engagement with a brake element lug, and means surrounding the upper end portions of said arms for limiting their movement away from each other, one of the arms projecting above said means and being bent thereover, and one of said arms being provided with an offset engaging the opposite end of said means, whereby said means is locked on the arms.

8. A key for connecting a brake shoe to a brake head having cooperating lugs, comprising a pair of resilient arms connected to each other and provided with a lug-engaging detent, and a strip-like member slidably mounted between the arms and movable inwardly thereof for spreading them to position said detent in locked engagement with a brake element lug and movable outwardly to permit the arms to move toward each other to withdraw said detent, one of said arms being provided with an offset, and said strip-like member having a hump for engaging the offset when said member is moved outwardly whereby said outward movement of the member is limited.

FREDERIC SCHAEFER.